Feb. 5, 1952     C. F. DEANE     2,584,676
DEPTH GAUGE FOR DRILL PRESSES
Filed April 26, 1950
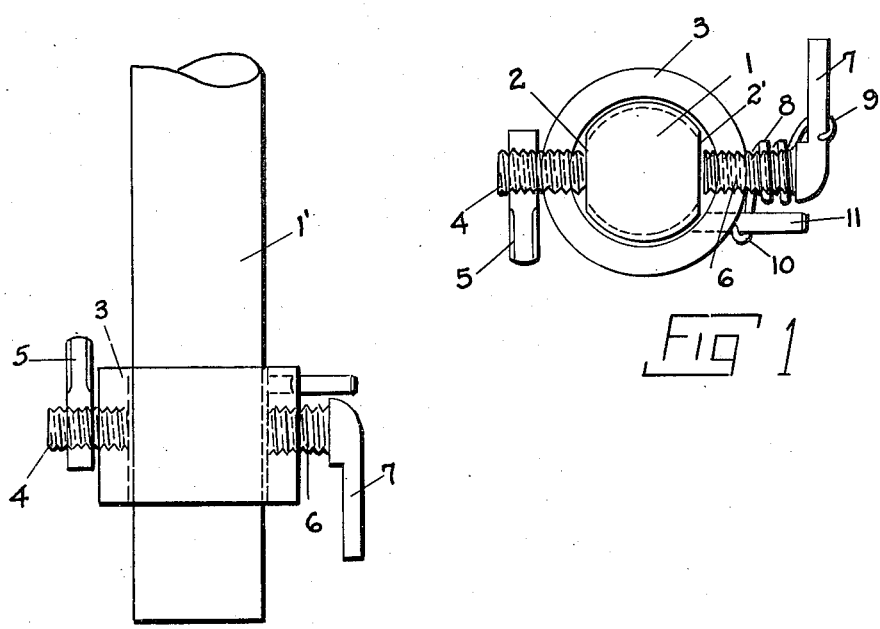
INVENTOR.
CECIL F. DEANE
BY
ATTORNEY Patented Feb. 5, 1952

2,584,676

UNITED STATES PATENT OFFICE 2,584,676

DEPTH GAUGE FOR DRILL PRESSES

Cecil F. Deane, Wichita, Kans.

Application April 26, 1950, Serial No. 158,141

1 Claim. (Cl. 77—34.5)

This invention relates in general to depth gauges for drill presses and in particular to a slidable, quick-adjusting and locking depth gauge, easily and positively set in gauging position and easily releasable when changing to another position.

Insofar as I am aware most depth gauges are of the screw type which require considerable time when moving any considerable distance from one position to another. Also, such a depth gauge requires precision machine work to construct and is relatively expensive.

It is one object of my invention to provide for use on a gauge guide or arm of a drill press, a depth gauge freely slidable on said arm, a locking member normally urged into non-locking position, the contact friction between the locking member and the gauge guide being sufficient to hold the depth gauge fixed to the shaft or arm and rendering temporarily inoperative the means urging the locking member into non-locking position.

Another object of the invention is to provide a sliding depth gauge with a set screw preferably diametrically opposite the locking member for clearance adjustment of the sliding depth gauge.

Other objects and advantages as well as the construction and operation of my invention will be apparent by reference to the following specification in connection with the accompanying drawing in which:

Fig. 1 is a top plan view of the depth gauge mounted on the gauge guide.

Fig. 2 is a front elevational view of the same, a fragmentary portion of the gauge guide being shown.

Referring now to the drawing by numerals of reference, 1 designates a gauge guide or arm use of which is common on most drill presses.

In one form of my invention side flat surfaces 2 and 2' are provided on the guide 1, a collar 3 being adapted to slide freely on said arm.

The collar 3 carries a set screw 4 on one side thereof adapted to contact one of the flat surfaces 2, a short lever arm 5 threadedly engaging the set screw and adapted to lock same in adjusted position.

Diametrically opposite set screw 4 and adapted to contact the other flat surface 2' is another set screw 6 carrying a short lever arm 7 at the end thereof.

A coil spring 8 surrounds the set screw 6 and has one end 9 engaging lever arm 7, the other end 10 of the spring engaging a pin 11 projecting from the collar 3.

The spring is so constructed and related to the lever arm, set screw and pin as to normally urge the pin out of engagement with the gauge guide so that when the set screw is released the collar will slide freely.

In operating the device, when using the drill press and the chuck with the drill bit is depressed to the desired drilling depth, it is merely necessary to impart a slight movement to the short lever arm 7 moving the set screw 6 into contact with the flat surface 2' of the stop guide or arm 1. The frictional contact between the set screw and the gauge guide will be sufficient to overcome any tendency on the part of the spring to loosen the set screw.

When making a change in the setting of the depth gauge it is only necessary to move the lever arm 7 sufficiently to release it from the gauge guide, the spring automatically turning the set screw and maintaining it in guide clearing position so that the gauge can be moved freely up or down for a new setting.

From the foregoing it will be apparent that I have provided a simple, inexpensive and easily operated, yet effective, depth gauge for drill presses, quickly adjustable and with positive locking means for setting in any desired position. Although on some drill presses in production work gauge settings for certain operations are rarely changed, in many cases, particularly in the small machine shop or manufacturing plant where equipment is limited, a drill press will be required to perform several operations and settings must be changed frequently.

With a screw type depth gauge considerable time will be consumed in rotating the collar particularly if any great change in setting is made. With my depth gauge, however, the setting can be made instantaneously, a flick of the thumb releasing short lever arm 7, the spring 8 keeping it released as it is rapidly slid to the new position and a very slight movement of lever arm 7 again locking the screw 6 and collar 3 in fixed position on the gauge guide 1.

The device can be applied to drill presses already in use, it being necessary only to make the collar of sufficient size to clear the threads on the gauge guide, the flat sides 2 and 2' being provided on most gauge guides. In Fig. 2, the device is shown applied to a round gauge guide on which it will work equally effectively.

It is obvious that changes in form, proportion and details of construction may be resorted to without departing from the spirit of my invention and I reserve all rights to such changes as come within the scope of this specification and the claim which follows.

What I claim as new and desire to secure by Letters Patent is:

In combination with the gauge guide of a drill press, said gauge guide having diametrically opposed flat surfaces, a depth gauge comprising a collar normally freely slidable on the gauge guide, an adjustable set screw on one side of the collar adapted to contact one of the flat surfaces on the gauge guide, a lock screw on the other side of the collar adapted to be moved into and out of engagement with the other flat surface of the gauge guide, and spring means normally rotatively urging the lock screw away from gauge guide contacting position.

CECIL F. DEANE.

REFERENCES CITED

The following references are of record in the file of this patent:

UNITED STATES PATENTS

| Number | Name | Date |
|---|---|---|
| 1,274,369 | Bendix | Aug. 6, 1918 |
| 1,984,500 | Tautz | Dec. 18, 1934 |
| 2,110,537 | Tautz | Mar. 8, 1938 |
| 2,477,891 | O'Neill | Aug. 2, 1949 |